United States Patent
Kurakawa et al.

(10) Patent No.: US 11,072,387 B2
(45) Date of Patent: Jul. 27, 2021

(54) SWING ARM FOR SADDLE RIDING VEHICLE

(71) Applicant: HONDA MOTOR CO., LTD., Tokyo (JP)

(72) Inventors: Yukinori Kurakawa, Asaka (JP); Yusuke Ueki, Asaka (JP); Yuji Ishitsuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 216 days.

(21) Appl. No.: 16/191,144

(22) Filed: Nov. 14, 2018

(65) Prior Publication Data

US 2019/0176927 A1    Jun. 13, 2019

(30) Foreign Application Priority Data

Dec. 7, 2017  (JP) .............................. JP2017-235101

(51) Int. Cl.
| | |
|---|---|
| *B62K 11/04* | (2006.01) |
| *B62K 19/16* | (2006.01) |
| *B62K 25/28* | (2006.01) |
| *B62M 9/16* | (2006.01) |

(52) U.S. Cl.
CPC ............ *B62K 25/28* (2013.01); *B62K 25/283* (2013.01); *B62M 9/16* (2013.01)

(58) Field of Classification Search
CPC ...... B62K 25/28; B62K 25/283; B62K 19/16; B62K 19/28; B62K 11/04; B62M 7/00
USPC ................................... 180/227; 280/284, 288
See application file for complete search history.

(56) References Cited

U.S. PATENT DOCUMENTS

| | | | | |
|---|---|---|---|---|
| 3,833,242 A | * | 9/1974 | Thompson, Jr. ....... | B62K 19/34 280/281.1 |
| 4,540,193 A | * | 9/1985 | Noda ................... | B62K 25/286 180/219 |
| 5,122,210 A | * | 6/1992 | Kubomura .......... | B29C 66/5223 156/78 |
| 5,445,400 A | * | 8/1995 | Martin ..................... | B62K 3/04 280/281.1 |
| 5,456,481 A | * | 10/1995 | Allsop .................. | B29C 45/006 280/274 |
| 5,692,764 A | * | 12/1997 | Klein ..................... | B62K 21/02 280/279 |

(Continued)

FOREIGN PATENT DOCUMENTS

| | | |
|---|---|---|
| CA | 2 462 090 | 11/2006 |
| CA | 2 713 503 | 5/2013 |

(Continued)

OTHER PUBLICATIONS

Translation of JP-S60-107471, Tanaka Toshio et al., Hatachi Chemical Co., Dec. 1985. (Year: 1985).*

(Continued)

*Primary Examiner* — Anne Marie M Boehler
(74) *Attorney, Agent, or Firm* — Rankin, Hill & Clark LLP

(57) ABSTRACT

The swing arm for the saddle riding vehicle that supports a wheel in a swingable manner includes a swing arm main body made of a fiber reinforced resin. The swing arm main body is formed to be hollow, and an embedded member of a material different from the fiber reinforced resin is embedded in such a manner as to make solid at least part of the hollow portion of the swing arm main body.

4 Claims, 10 Drawing Sheets

(56) References Cited

U.S. PATENT DOCUMENTS

| | | | | |
|---|---|---|---|---|
| 5,857,690 | A * | 1/1999 | Gueugneaud | B29C 33/308 |
| | | | | 280/281.1 |
| 6,267,399 | B1 * | 7/2001 | Buckmiller | B29C 53/824 |
| | | | | 280/274 |
| 6,340,509 | B1 * | 1/2002 | Nelson | B29C 33/40 |
| | | | | 428/34.7 |
| 9,346,513 | B2 * | 5/2016 | Hsu | B62K 19/02 |
| 9,463,840 | B1 * | 10/2016 | Wu | B29C 49/0005 |
| 2004/0124604 | A1 * | 7/2004 | Takano | B62K 25/283 |
| | | | | 280/283 |
| 2005/0151344 | A1 * | 7/2005 | Parkin | B62K 25/26 |
| | | | | 280/284 |
| 2010/0181742 | A1 * | 7/2010 | Mori | B62M 9/16 |
| | | | | 280/284 |
| 2011/0042917 | A1 * | 2/2011 | Cleveland | B62K 19/24 |
| | | | | 280/288 |
| 2012/0235379 | A1 * | 9/2012 | Trimble | B62K 25/286 |
| | | | | 280/285 |
| 2017/0088227 | A1 * | 3/2017 | Yamamoto | B62K 25/283 |
| 2018/0215440 | A1 * | 8/2018 | Omosako | B62K 11/02 |

FOREIGN PATENT DOCUMENTS

| | | | |
|---|---|---|---|
| EP | 0590239 A1 * | 4/1994 | B62K 19/16 |
| EP | 1 305 203 | 5/2004 | |
| JP | S58-224875 | 12/1983 | |
| JP | S60-107471 | 6/1985 | |
| JP | 05139361 A * | 6/1993 | B62K 25/283 |
| JP | H8-99364 | 4/1996 | |

OTHER PUBLICATIONS

JP5-139361 to Shunichi Bando et al., translation (Year: 1997).*
Indian Office Action dated Nov. 1, 2019, English translation included, 6 pages.
Japanese Office Action with English translation dated Jun. 4, 2019, 8 pages.

* cited by examiner

SWING ARM FOR SADDLE RIDING VEHICLE

INCORPORATION BY REFERENCE

The present application claims priority under 35 U.S.C. § 119 to Japanese Patent Application No. 2017-235101 filed on Dec. 7, 2017. The content of the application is incorporated herein by reference in its entirety.

TECHNICAL FIELD

The present invention relates to a swing arm for a saddle riding vehicle.

BACKGROUND ART

Hitherto, it has been known to configure a hollow structural part (propeller shaft) from a fiber reinforced resin (see, for example, Patent Document 1). In Patent Document 1, a plurality of fiber reinforced resin layers are laminated, whereby the thickness of the structural part is increased.

PRIOR ART DOCUMENT

Patent Document

[Patent Document 1]
Japanese Patent Laid-Open No. Hei 8-99364

SUMMARY OF THE INVENTION

Problem to be Solved by the Invention

Meanwhile, it may be contemplated to configure a swing arm for a saddle riding vehicle in a hollow shape from a fiber reinforced resin, in view of lightening in weight and enhancing rigidity. In this case, with part of the hollow portion of the swing arm made to be solid, the rigidity of the swing arm can be adjusted. However, in the structure in which a plurality of fiber reinforced resin layers are laminated as in the above-mentioned conventional structural part, it takes labor for the manufacture, and the fiber length in the fiber reinforced resin layers is liable to become shorter, making it difficult to obtain high rigidity.

The present invention has been made in consideration of the above-mentioned circumstances. It is therefore an object of the present invention to enable part of a hollow portion to be easily made to be solid, and to realize high rigidity, in a swing arm for a saddle riding vehicle.

Means for Solving the Problem

According to an aspect of the present invention, there is provided a swing arm for a saddle riding vehicle that supports a wheel (3) in a swingable manner. The swing arm includes a swing arm main body (25) made of a fiber reinforced resin, in which the swing arm main body (25) is formed to be hollow, and an embedded member (70, 170) of a material different from the fiber reinforced resin is embedded in such a manner as to make solid at least part of a hollow portion (25a) of the swing arm main body (25).

In addition, in the aspect of the above-mentioned invention, the embedded member (70, 170) may be formed in a shape along inner surfaces of both side surfaces (63, 64) in a transverse direction of the vehicle of the swing arm main body (25) and along an inner surface of a surface (61) in a vertical direction of the swing arm main body (25).

Besides, in the aspect of the above-mentioned invention, the embedded member (70, 170) may be a resin foam (70, 170).

Further, in the aspect of the above-mentioned invention, a wheel support section (21) to which the wheel (3) is mounted may be provided at an end portion of the swing arm main body (25), and a solid portion in which the embedded member (70, 170) is embedded may be provided in the wheel support section (21).

In addition, in the aspect of the above-mentioned invention, the wheel support section (21) may include end pieces (28L, 28R) adapted to support the wheel (3), and a guide section (72, 172) adapted to position the end pieces (28L, 28R) relative to the swing arm main body (25).

Besides, in the aspect of the above-mentioned invention, the guide section (72, 172) may include the embedded member (70, 170), and the fiber reinforced resin covering a surface (70d) of the embedded member (70, 170).

Effects of the Invention

According to the swing arm for the saddle riding vehicle according to the aspect of the present invention, the swing arm for the saddle riding vehicle supports the wheel in a swingable manner, and includes the swing arm main body made of a fiber reinforced resin; in addition, the swing arm main body is formed to be hollow, and the embedded member of a material different from the fiber reinforced resin is embedded in such a manner as to make solid at least part of the hollow portion of the swing arm main body.

According to this configuration, the hollow portion of the swing arm main body can be easily made to be solid by the embedded material of the material different from the fiber reinforced resin, and the rigidity of the swing arm main body can be enhanced.

In addition, in the aspect of the above-mentioned invention, the embedded member may be formed in a shape along the inner surfaces of both sides surfaces in the transverse direction of the vehicle of the swing arm main body and along the inner surface of the surface in the vertical direction of the swing arm main body. According to this configuration, the hollow portion can be easily filled up with the embedded member, and the rigidity of the swing arm main body can be enhanced.

Besides, in the aspect of the above-mentioned invention, the embedded member may be a resin foam. This configuration enables the embedded member to be provided to be light in weight and easily.

Further, in the aspect of the above-mentioned invention, the wheel support section to which the wheel is mounted may be provided at an end portion of the swing arm main body, and the solid portion in which the embedded body is embedded may be provided in the wheel support section. According to this configuration, the embedded member is embedded in the end portion of the swing arm main body and, therefore, can be easily embedded. Besides, the rigidity of the wheel support section on which a high load is liable to be exerted can be effectively enhanced by the embedded member.

In addition, in the aspect of the above-mentioned invention, the wheel support section may include the end pieces adapted to support the wheel and the guide section adapted to position the end pieces relative to the swing arm main body. According to this configuration, the end pieces that support the wheel can be positioned relative to the swing arm main body by the guide section, and can be easily mounted in position.

Besides, in the aspect of the above-mentioned invention, the guide section may include the embedded member and the fiber reinforced resin covering the surface of the embedded member. According to this configuration, the guide section can be more easily formed in an arbitrary shape due to the embedded member, the size of the guide section can be more easily enlarged, and a guide section higher in rigidity can be provided, as compared to a structure in which the guide section is formed from the fiber reinforced resin alone.

MODE FOR CARRYING OUT THE INVENTION

Figure 1:
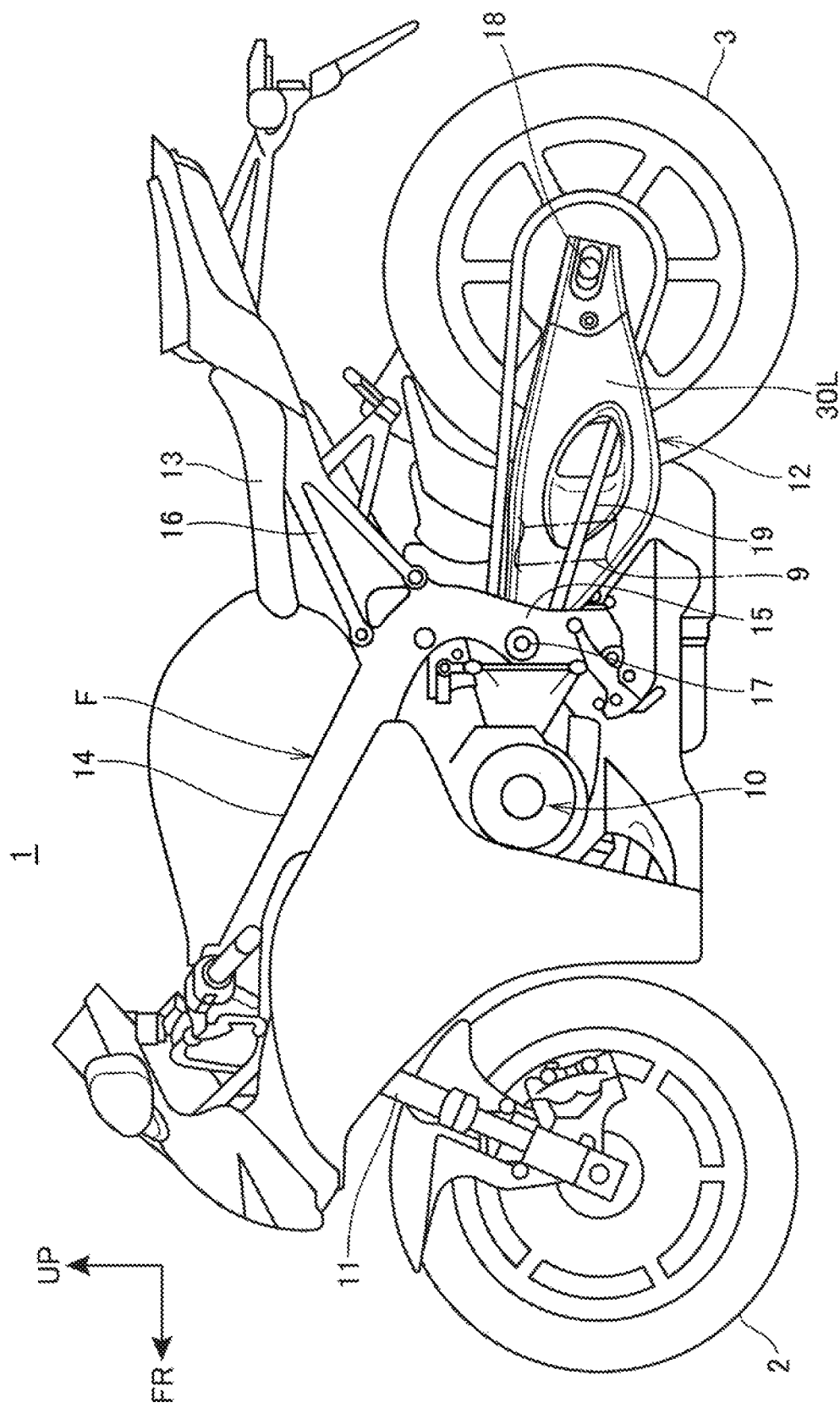
FIG. 1 is a left side view of a motorcycle according to an embodiment of the present invention.

An embodiment of the present invention will be described below, referring to the drawings. Note in the following description that, the directions or sides such as front, rear, left, right, upper and lower sides will be the same as those with reference to the vehicle body, unless otherwise specified. In addition, reference symbol FR in each drawing indicates the vehicle body front side, reference symbol UP indicates the vehicle body upper side, and reference symbol LH indicates the vehicle body left-hand side. Besides, in the drawings, the vehicle body right-hand side may be indicated by reference symbol RH.

FIG. 1 is a left side view of a motorcycle according to an embodiment of the present invention.

The motorcycle 1 is a vehicle in which an engine 10 as a power unit is supported on a body frame F, a steering system 11 supporting a front wheel 2 in a steerable manner is steerably supported on a front end of the body frame F, and a swing arm 12 supporting a rear wheel 3 (wheel) is provided on a rear side of the body frame F. The motorcycle 1 is a saddle riding vehicle in which a seat 13 on which a driver is seated in a straddling manner is provided on an upper side of a rear portion of the body frame F.

The body frame F includes a head pipe (not depicted) that supports the steering system 11, a pair of left and right main frames 14 extending rearwardly downward from the head pipe, a pair of left and right pivot frames 15 extending downward from rear end portions of the main frames 14, and a seat frame 16 extending rearward from the rear end portions of the main frames 14.

The motorcycle 1 has a pivot shaft 17 that connects the left and right pivot frames 15 in the transverse direction of the vehicle (left-right direction). The pivot shaft 17 extends in the transverse direction of the vehicle.

A front end of the swing arm 12 is pivotally supported by the pivot shaft 17. The swing arm 12 is capable of swinging upward and downward, with the pivot shaft 17 as a center. The swing arm 12 is connected to the body frame F through a tubular rear cushion unit 9.

The rear wheel 3 is rotatably supported by an axle 18 provided at a rear end portion of the swing arm 12.

The engine 10 is disposed on the lower side of the main frames 14 and on the front side of the pivot frames 15. An output of the engine 10 is transmitted to the rear wheel 3 by a drive chain 19 arranged between an output shaft (not depicted) of the engine 10 and the rear wheel 3.

Figure 2:
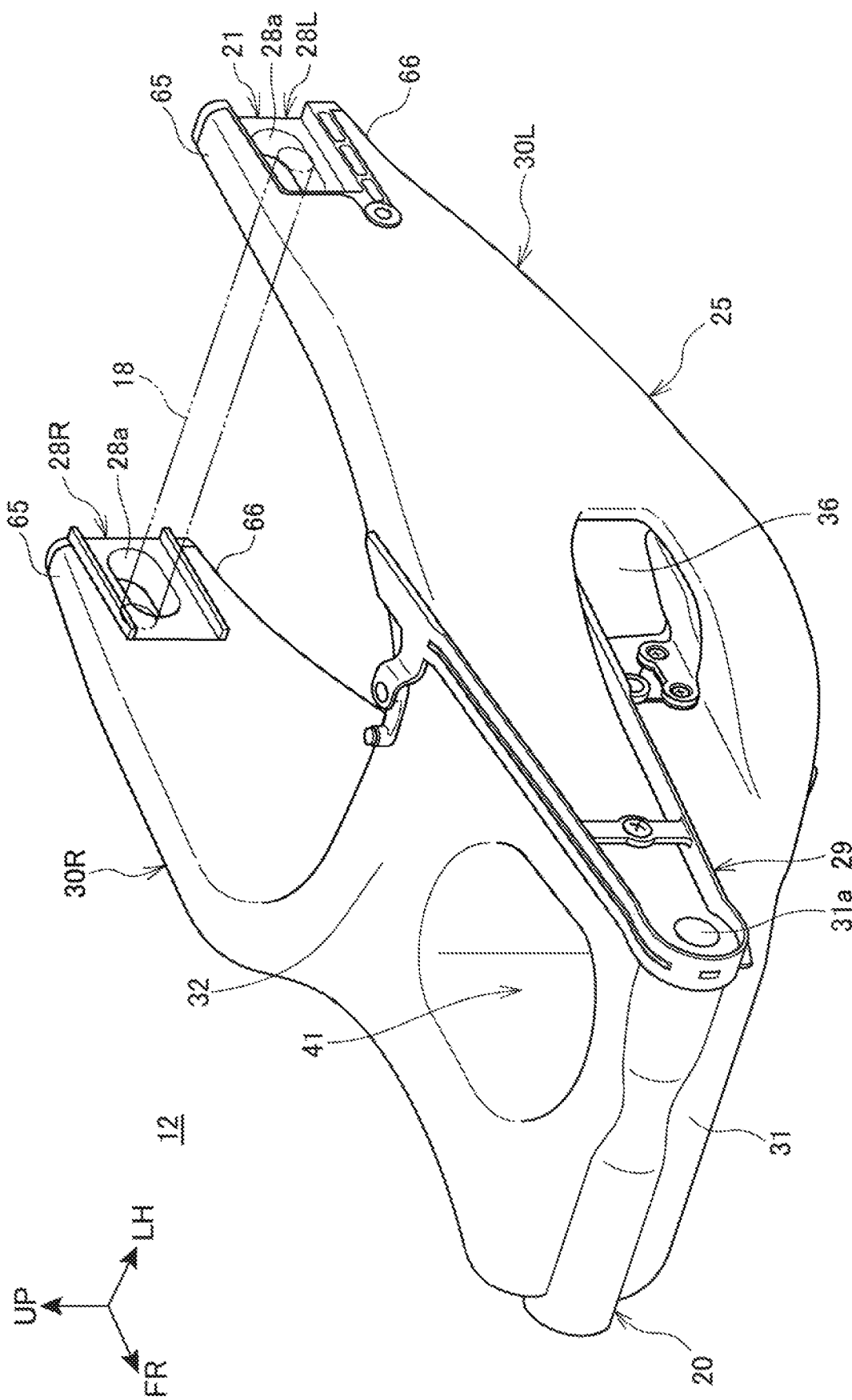
FIG. 2 is a perspective view of a swing arm, as viewed from a left front side.

FIG. 2 is a perspective view of the swing arm 12, as viewed from a left front side.

The swing arm 12 is provided at a front end portion thereof with a pivot section 20 pivotally supported by the pivot shaft 17 (FIG. 1), and is provided at a rear end portion thereof with a wheel support section 21 that supports the rear wheel 3 through the axle 18.

Figure 3:
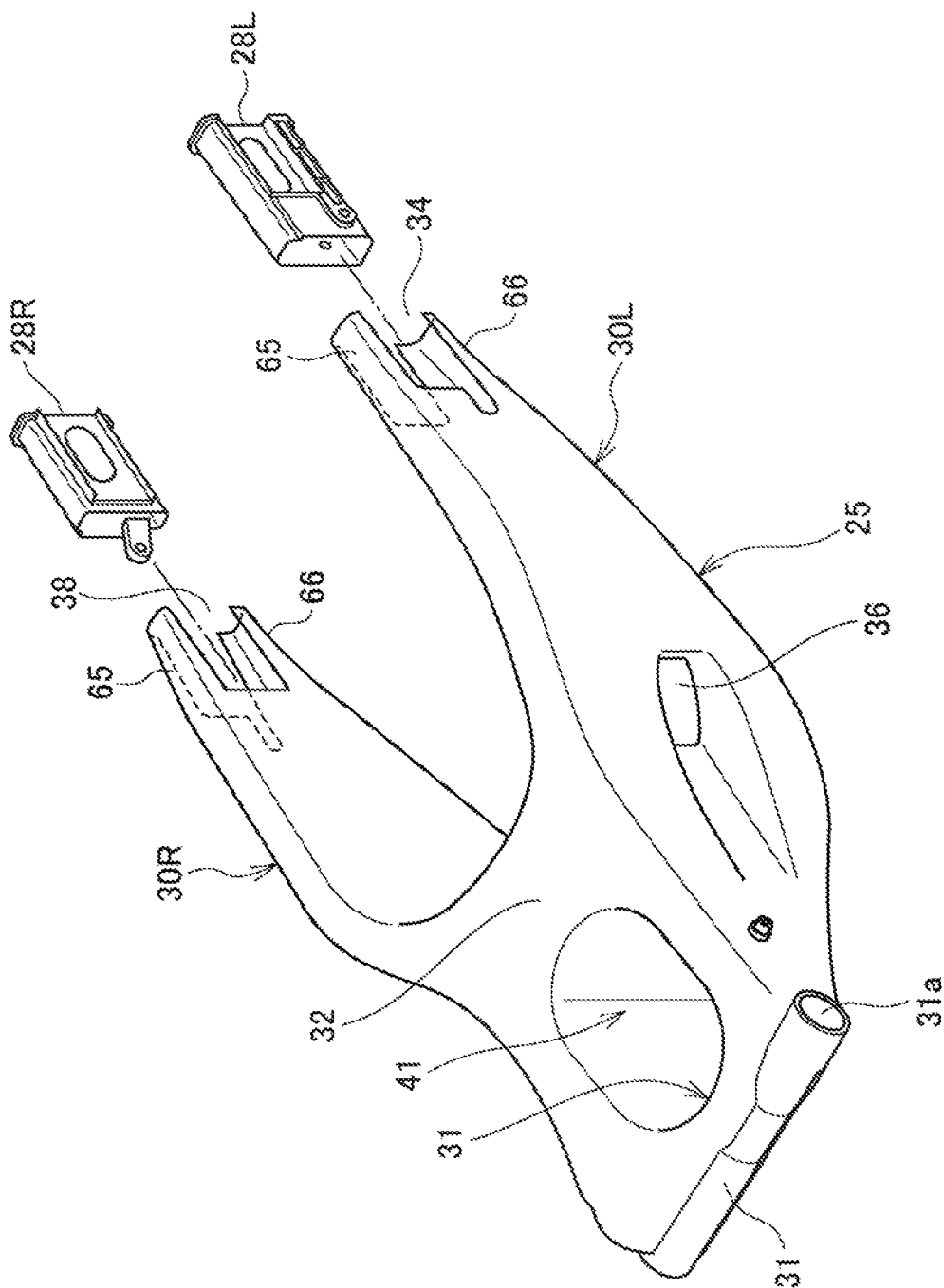
FIG. 3 is an exploded perspective view of the swing arm.

FIG. 3 is an exploded perspective view of the swing arm 12.

As illustrated in FIGS. 2 and 3, the swing arm 12 includes a swing arm main body 25 extending in an arm shape from the pivot shaft 17 side toward the rear wheel 3 side, and a pair of left and right end pieces 28L and 28R connected to rear end portions of the swing arm main body 25.

A chain slider 29 adapted to guide the drive chain 19 (FIG. 1) is mounted to the swing arm 12.

The swing arm main body 25 is formed in a box shape having a space in the inside thereof, and the whole of the part forming the box-shaped outer shell is formed of a fiber reinforced resin.

The fiber reinforced resin constituting the swing arm main body 25 is, for example, CFRP (carbon fiber reinforced plastic). The CFRP is a composite material composed of a matrix resin and reinforcement carbon fiber, and is formed, for example, by impregnating a cloth woven from warp and weft, which are composed of bundles of carbon fibers, with a matrix resin, and heating and curing the resulting material. While a thermosetting resin, for example, is used as the matrix resin, a thermoplastic resin may also be used.

Note that as the fiber reinforced resin, not only the CFRP but other FRPs (fiber reinforced plastics) using other kinds of fibers may be used.

The swing arm main body 25 integrally includes: a one-side arm section 30L located on one of left and right sides of the rear wheel 3; an other-side arm section 30R located on the other of the left and right sides of the rear wheel 3; a front end connection section 31 connecting a front end portion of the one-side arm section 30L and a front end portion of the other-side arm section 30R in the transverse direction of the vehicle (left-right direction); and an intermediate connection section 32 connecting the one-side arm section 30L and the other-side arm section 30R in the transverse direction of the vehicle on the rear side of the front end connection section 31.

The one-side arm section 30L is in a tubular form which is formed to be hollow from the side of the pivot section 20 at a front end to a rear end opening 34 at a rear end. The one-side arm section 30L is larger in size in the vertical direction than in the transverse direction of the vehicle, over the whole length thereof.

The one-side arm section 30L is provided, at an intermediate portion thereof in the longitudinal direction of the vehicle, with a chain passing hole 36 which penetrates the one-side arm section 30L in the longitudinal direction of the vehicle and in the transverse direction of the vehicle. A lower portion of the drive chain 19 is passed through the chain passing hole 36.

The other-side arm section 30R is in a tubular form which is formed to be hollow from the side of the pivot section 20 at a front end to a rear end opening 38 at a rear end. The other-side arm section 30R is larger in size in the vertical direction than in the transverse direction of the vehicle, over the whole length thereof.

The wheel support section 21 is provided at a rear end portion of the one-side arm section 30L and a rear end portion of the other-side arm section 30R.

The end piece 28L is inserted into the rear end opening 34 from the rear side, and is connected to a rear end portion of the one-side arm section 30L. The end piece 28R is inserted into the rear end opening 38 from the rear side, and is connected to a rear end portion of the other-side arm section 30R.

The end pieces 28L and 28R are provided with axle passing holes 28a penetrating the end pieces 28L and 28R in the transverse direction of the vehicle. The axle 18 is inserted in and passed through the axle passing holes 28a, and is supported by the end pieces 28L and 28R.

The intermediate connection section 32 of the swing arm main body 25 is formed in a hollow form through which the inside of the one-side arm section 30L and the inside of the other-side arm section 30R communicate with each other in the transverse direction of the vehicle.

The front end connection section 31 of the swing arm main body 25 connects the one-side arm section 30L and the other-side arm section 30R in the transverse direction of the vehicle, and closes a front end of the one-side arm section 30L and a front end of the other-side arm section 30R.

Besides, the swing arm main body 25 is provided with a vertical communication hole 41 penetrating vertically a front portion of the swing arm main body 25. The vertical communication hole 41 is partitioned by inside surfaces of front portions of the one-side arm section 30L and the other-side arm section 30R, a front surface of the intermediate connection section 32, and a rear surface of the front end connection section 31.

The rear cushion unit 9 is disposed inside the vertical communication hole 41, and is passed through the vertical communication hole 41 in the vertical direction.

The pivot section 20 is a tubular section provided at the front end connection section 31 of the swing arm main body 25, and has a pivot hole 31a that penetrates the front end connection section 31 in the transverse direction of the vehicle.

The pivot shaft 17 (FIG. 1) is inserted in and passed through the pivot hole 31a. The pivot shaft 17 is connected to the pivot section 20 through a bearing (not depicted) provided inside the pivot hole 31a.

Figure 4:
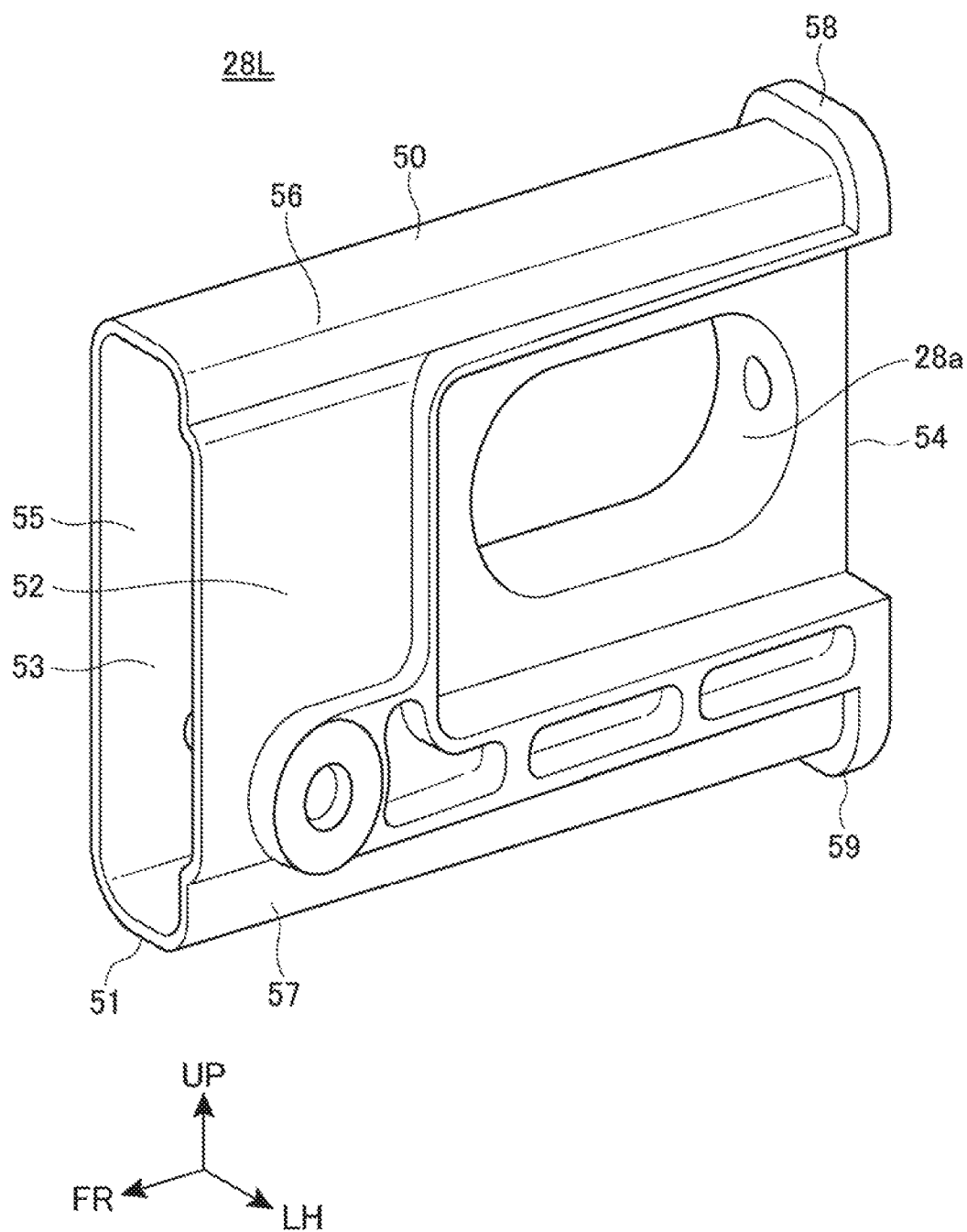
FIG. 4 is a perspective view of an end piece on the left side, as viewed from a left front side.

FIG. 4 is a perspective view of the end piece 28L on the left side, as viewed from a left front side. Here, the left and right end pieces 28L and 28R and support structures for the end pieces 28L and 28R are configured in the same manner on the left and right sides, and, therefore, the structure concerning the left-side end piece 28L will be described in detail.

The end piece 28L is formed in a substantially rectangular plate shape, and is disposed such that the plate thickness direction is directed in the transverse direction of the vehicle. The end piece 28L is a plate which is larger in size in the vertical direction than in the transverse direction of the vehicle.

The end piece 28L includes: an upper surface 50; a lower surface 51 opposite to the upper surface 50; an outside surface 52 connecting vertically outer edges in the transverse direction of the vehicle of the upper surface 50 and the lower surface 51; an inside surface 53 connecting vertically inner edges in the transverse direction of the vehicle of the upper surface 50 and the lower surface 51; and a rear surface 54. A front side 55 of the end piece 28L is substantially entirely opening to the front side.

The upper surface 50 and the lower surface 51 are substantially parallel. The inside surface 53 and the outside surface 52 are opposite to each other, and are substantially parallel. The inside surface 53 and the outside surface 52 are substantially perpendicular to the upper surface 50 and the lower surface 51.

The axle passing hole 28a is provided in a vertically intermediate portion of a rear portion of the end piece 28L.

The axle passing hole 28a is formed in the shape of a slot elongate in the longitudinal vehicle direction, such that the position of the axle 18 can be adjusted in the longitudinal vehicle direction.

The end piece 28L includes an upper engagement section 56 and a lower engagement section 57 which are engaged with rear end portions of the one-side arm section 30L.

The upper engagement section 56 is composed of a part where an upper end portion of the end piece 28L is recessed by one step in the transverse direction of the vehicle, and the upper surface 50. The upper engagement section 56 extends straight from a front end to a rear end portion of the end piece 28L.

In addition, the end piece 28L includes a stopper section 58 projecting upward and in the transverse direction of the vehicle from a rear end of the upper engagement section 56.

The lower engagement section 57 is composed of a part where a lower end portion of the end piece 28L is recessed by one step in the transverse direction of the vehicle, and the lower surface 51. The lower engagement section 57 extends straight from a front end to a rear end portion of the end piece 28L.

Besides, the end piece 28L includes a stopper section 59 projecting downward and in the transverse direction of the vehicle from a rear end of the lower engagement section 57.

The material constituting the end pieces 28L and 28R is a metallic material, different from the material of the swing arm main body 25. In the present embodiment, the end pieces 28L and 28R are formed from a light metal such as an aluminum alloy.

Figure 5:
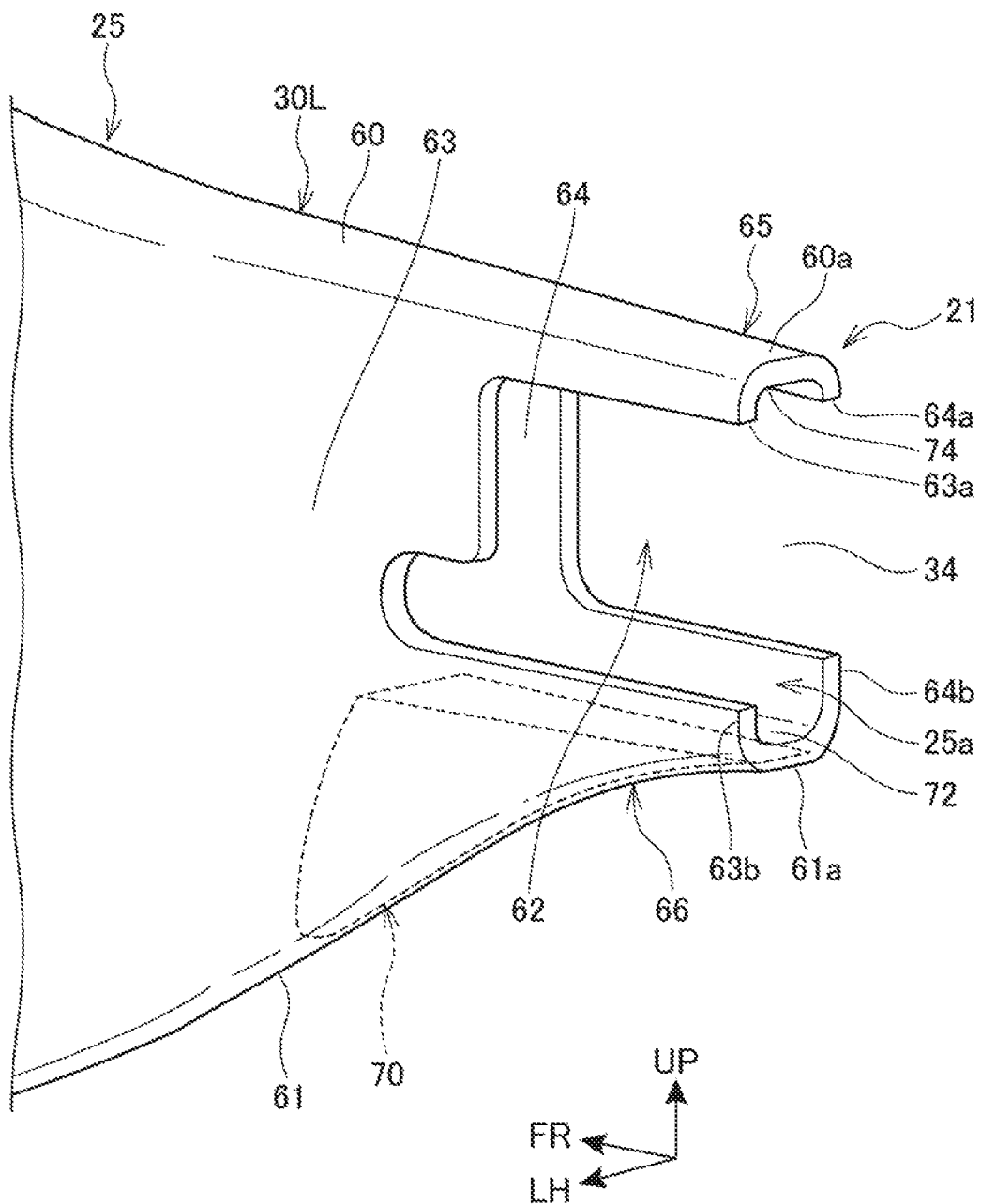
FIG. 5 is a perspective view of a rear portion of a one-side arm section, as viewed from a left rear side.
Figure 6:
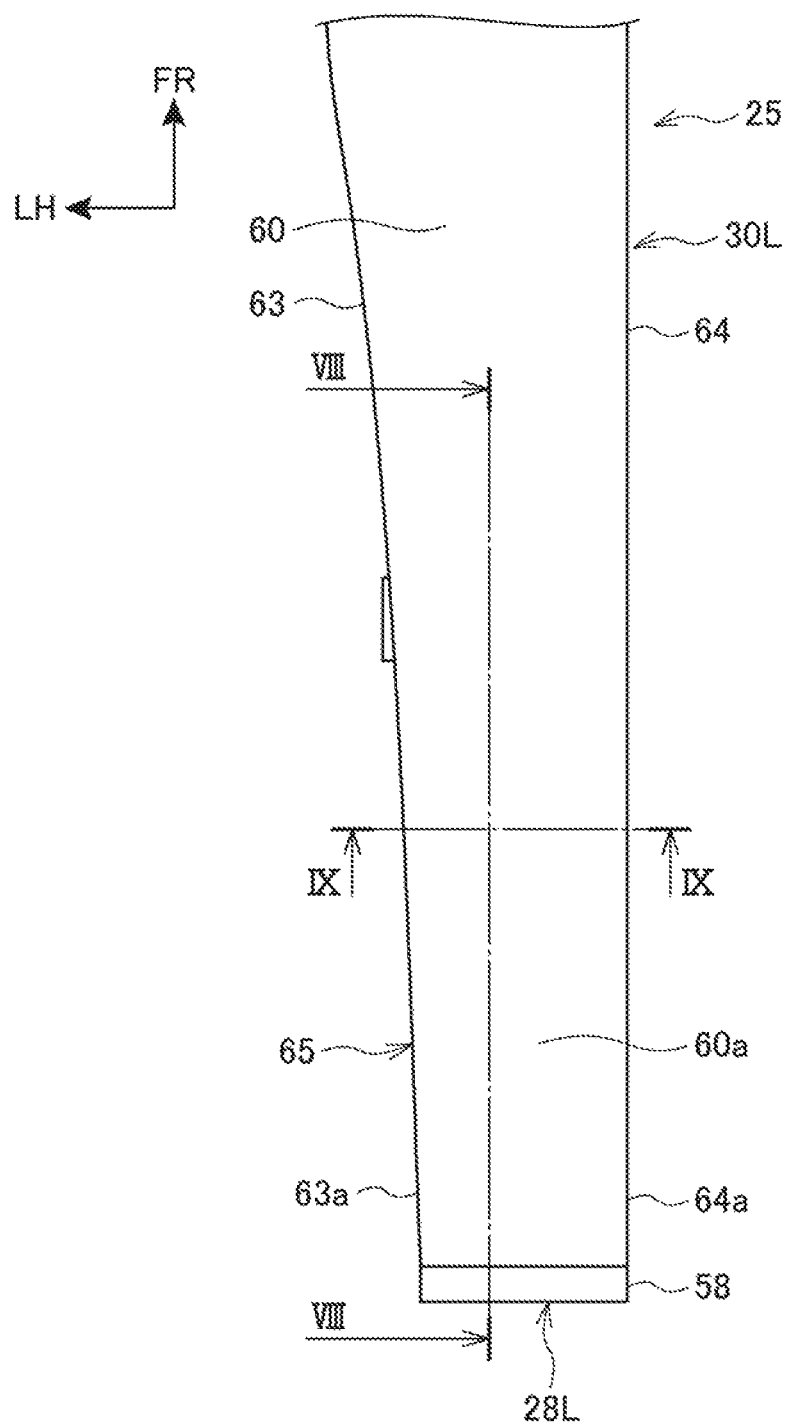
FIG. 6 is a plan view of the rear portion of the one-side arm section, as viewed from above.

FIG. 5 is a perspective view of a rear portion of the one-side arm section 30L as viewed from a left rear side. FIG. 6 is a plan view of the rear portion of the one-side arm section 30L, as viewed from above.

Referring to FIGS. 5 and 6, the rear portion of the one-side arm section 30L is formed such that its vertical size increases in going from the side of the rear end opening 34 at a rear end toward the front side.

More specifically, at the rear portion of the one-side arm section 30L, an upper wall section 60 of the one-side arm section 30L extends forward with a slightly forwardly downward inclination. In addition, at the rear portion of the one-side arm section 30L, a lower wall section 61 (a surface in the vertical direction) of the one-side arm section 30L extends forward with a forwardly upward inclination. The lower wall section 61 is larger than the upper wall section 60 in inclination relative to a horizontal plane. With the rear portion of the one-side arm section 30L thus shaped to be thicker (greater in diametric size) in going forward in side view, lightening in weight and enhancing rigidity of the one-side arm section 30L can both be realized.

In addition, the rear portion of the one-side arm section 30L is formed such that its size in the transverse direction of the vehicle increases in going from the side of the rear end opening 34 at the rear end toward the front side. More specifically, a side wall section 63 on an outer side in the transverse direction of the vehicle of the one-side arm section 30L is inclined such as to be located on an outer side in the transverse direction of the vehicle in going forward. A side wall section 64 on an inner side in the transverse direction of the vehicle of the one-side arm section 30L extends substantially straight in the longitudinal vehicle direction in top plan view.

The one-side arm section 30L is provided at a rear end portion thereof with a side opening 62 that penetrates the one-side arm section 30L in the transverse direction of the vehicle.

The side opening 62 is provided between the upper wall section 60 and the lower wall section 61, and penetrates the left and right side wall sections 63 and 64 of the one-side arm section 30L. A rear end of the side opening 62 is opening to the rear side, and communicates with the rear end opening 34.

With the side opening 62 thus provided, an upper-side support section 65 and a lower-side support section 66 extending in the longitudinal vehicle direction are formed on the upper side and the lower side of the side opening 62, at a rear end portion of the one-side arm section 30L.

The upper-side support section 65 includes a rear end portion 60a of the upper wall section 60, and a pair of upper side walls 63a and 64a extending downward respectively from left and right side edges of the rear end portion 60a. The upper-side support section 65 is formed in a rail shape such as to enable an upper portion of the end piece 28L to be supported between the left and right upper side walls 63a and 64a, and extends in the longitudinal vehicle direction.

The lower-side support section 66 includes a rear end portion 61a of the lower wall section 61, and a pair of lower side walls 63b and 64b extending upward respectively from left and right side edges of the rear end portion 61a. The lower-side support section 66 is formed in a rail shape such as to enable a lower portion of the end piece 28L to be supported between the left and right lower side walls 63b and 64b, and extends in the longitudinal vehicle direction.

As illustrated in FIG. 2, the axle support section 21 of the one-side arm section 30L includes the upper-side support section 65, the lower-side support section 66, and the end piece 28L.

In addition, the axle support section 21 of the other-side arm section 30R similarly includes the upper-side support section 65, the lower-side support section 66, and the end piece 28R.

As depicted in FIG. 5, an embedded member 70 that makes solid a lower part (part) of a hollow portion 25a of a rear end portion of the swing arm main body 25 is embedded in the axle support section 21.

The embedded member 70 is provided in the lower-side support section 66.

Figure 7:
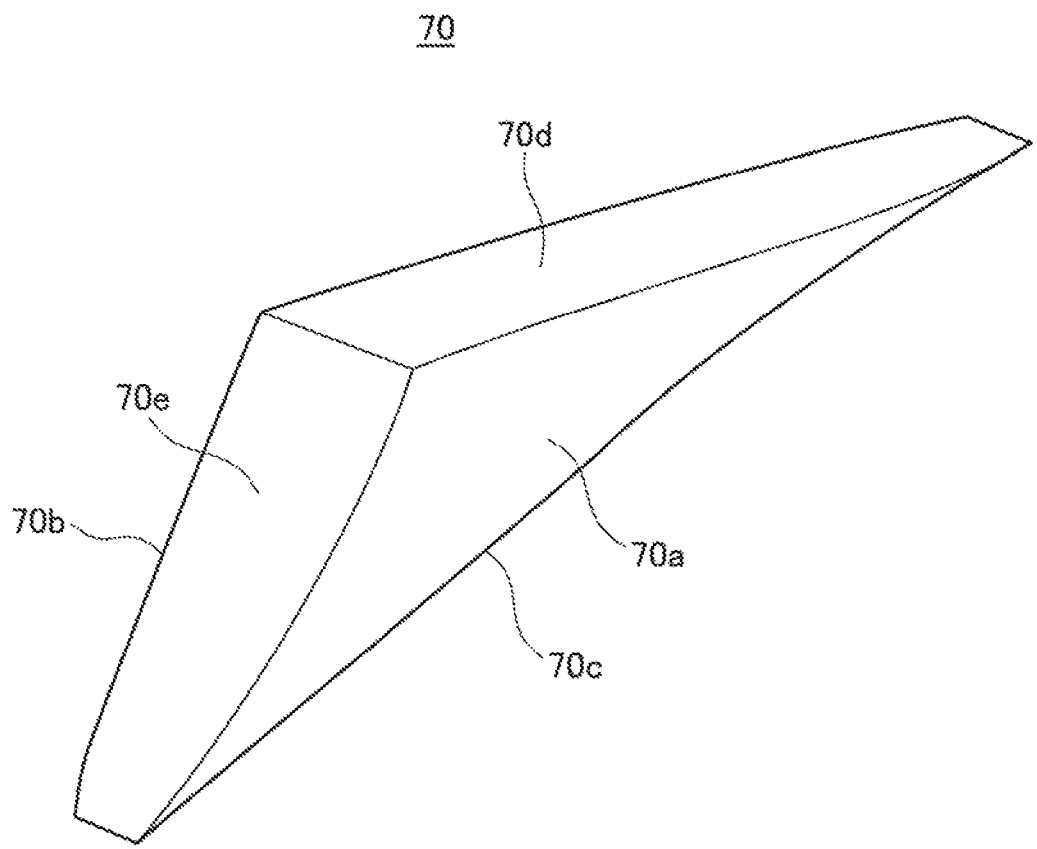
FIG. 7 is a perspective view of an embedded member, as viewed from a front lateral side.
Figure 8:
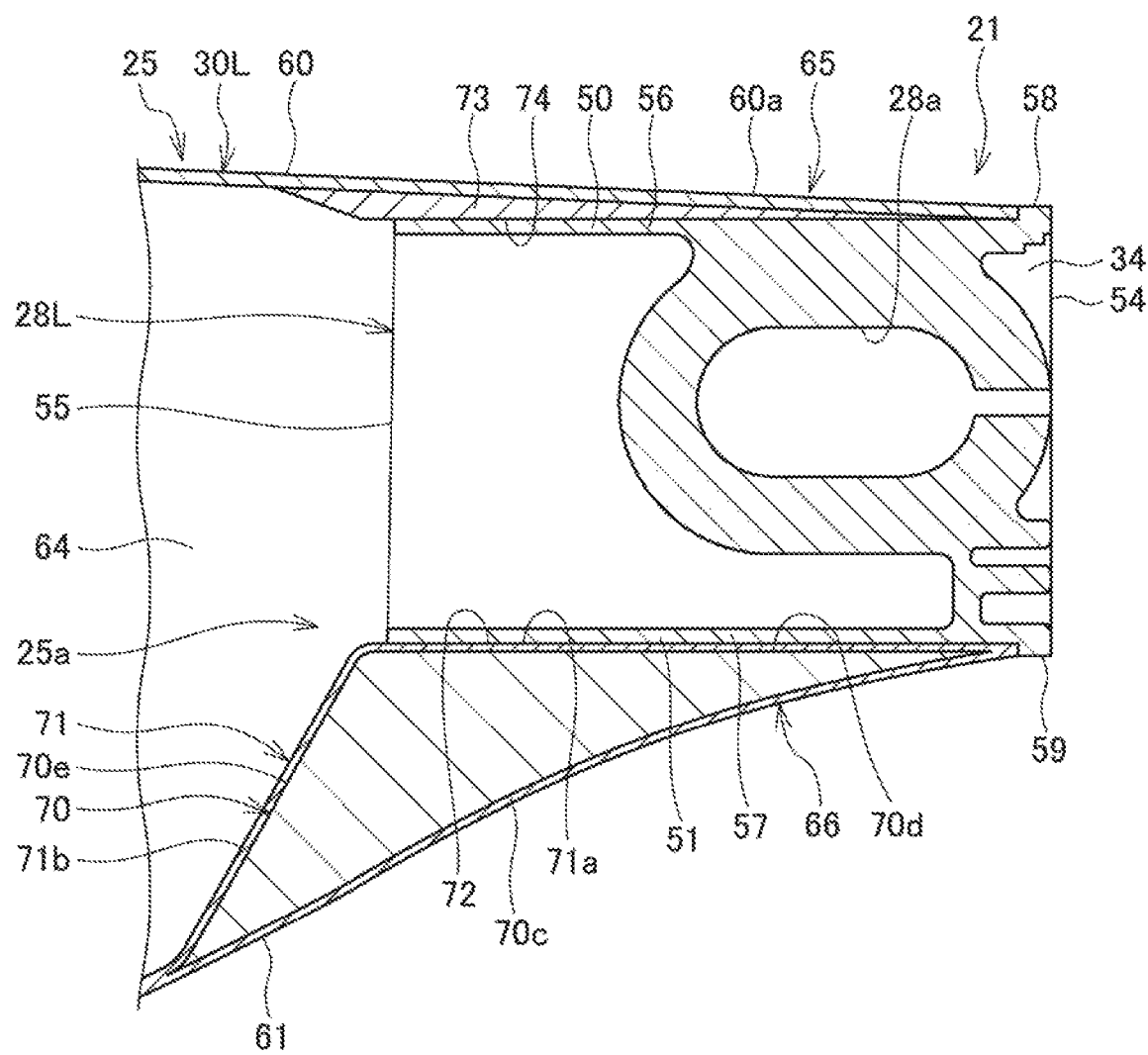
FIG. 8 is a sectional view taken along line VIII-VIII of FIG. 6.
Figure 9:
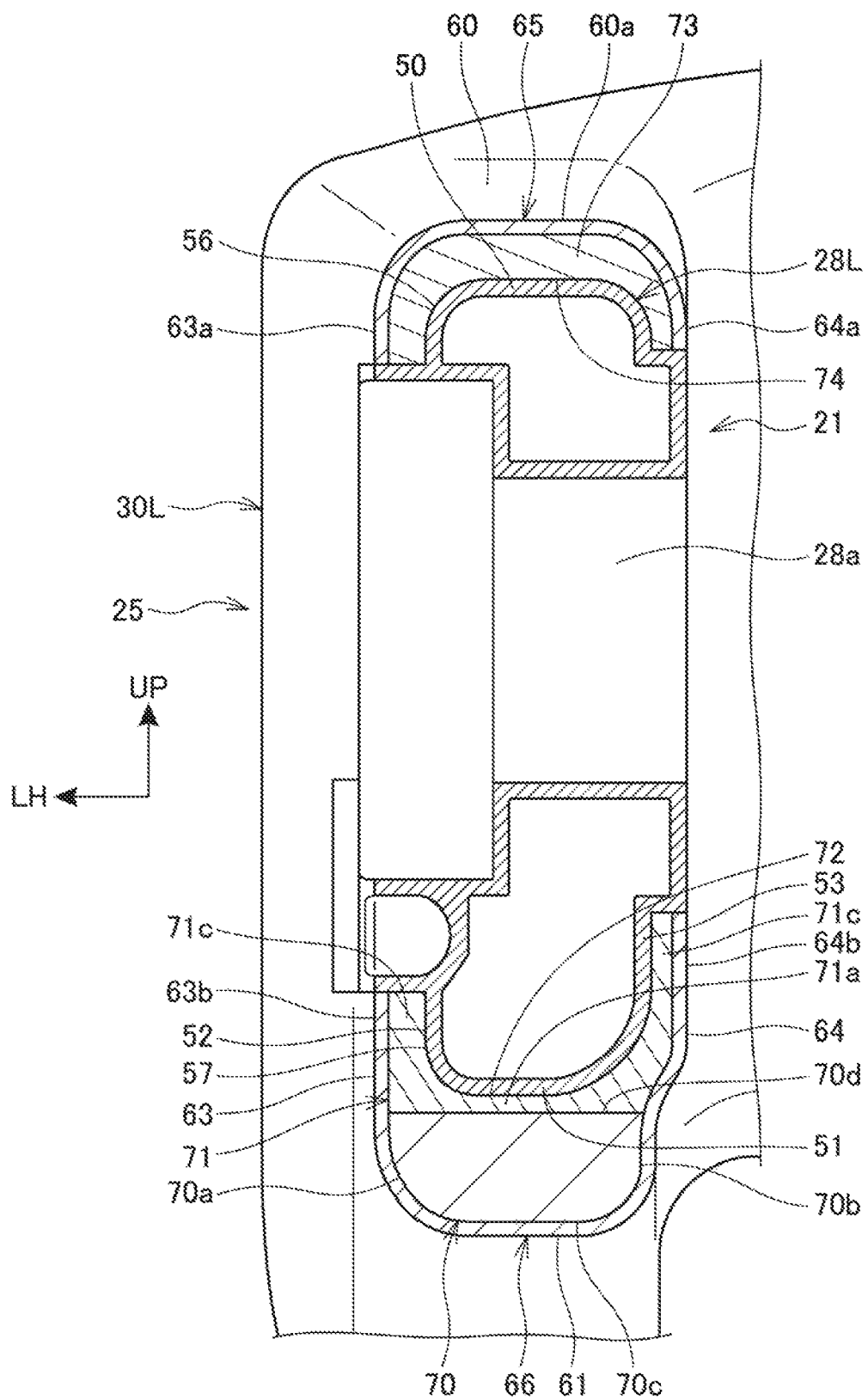
FIG. 9 is a sectional view taken along line IX-IX of FIG. 6.

FIG. 7 is a perspective view of the embedded member 70, as viewed from a front lateral side. FIG. 8 is a sectional view taken along line VIII-VIII of FIG. 6. FIG. 9 is a sectional view taken along line IX-IX of FIG. 6.

Referring to FIG. 5 and FIGS. 7 to 9, the embedded member 70 is formed in a block form provided between a lower portion of the side wall section 63 and a lower portion of the side wall section 64, at a rear end portion of the swing arm main body 25.

The embedded member 70 is formed of a rigid resin foam resin (a foamed body of a low-density polymer). The specific gravity of the embedded member 70 is lower than the specific gravity of the fiber reinforced resin constituting the swing arm main body 25. The embedded member 70 is, for example, Rohacell (registered trademark).

The embedded member 70 includes: an outside surface 70a along an inner surface of a lower portion of the side wall section 63; an inside surface 70b along an inner surface of a lower portion of the side wall section 64; a lower surface 70c along an inner surface of a lower wall section 61; an upper surface 70d connecting an upper edge of the outside surface 70a and an upper edge of the inside surface 70b in the transverse direction of the vehicle; and a front surface 70e.

More specifically, the lower surface 70c of the embedded member 70 extends forward from a rear end with a forwardly downward inclination along the inner surface of the lower wall section 61. In addition, the upper surface 70d of the embedded member 70 extends forward substantially horizontally from a rear end, substantially in parallel to the inner surface of the rear end portion 60a of the upper wall section 60 of the upper-side support section 65. Therefore, the embedded member 70 increases in its vertical size in going from the rear end toward the front end side.

The front surface 70e of the embedded member 70 connects front edges of the outside surface 70a and the inside surface 70b in the transverse direction of the vehicle, and connects front edges of the upper surface 70d and the lower surface 70c in the vertical direction. The front surface 70e extends obliquely forwardly downward from a front edge of the upper surface 70d to a front edge of the lower surface 70c.

As illustrated in FIGS. 8 and 9, the embedded member 70 is bonded to an inner surface of a rear end portion of the swing arm main body 25 with an adhesive, in a state in which the outside surface 70a, the inside surface 70b, and the lower surface 70c thereof are in close contact with an inner surface of a lower portion of the side wall section 63, an inner surface of a lower portion of the side wall section 64, and an inner surface of the lower wall section 61, respectively.

The upper surface 70d and the front surface 70e of the embedded member 70 are entirely covered with a cover section 71. The cover section 71 includes a cover upper surface section 71a that covers the upper surface 70d as a surface of the embedded member 70, and a cover front surface section 71b that covers the front surface 70e.

The material constituting the cover section 71 is the same fiber reinforced resin as the material of the swing arm main body 25. The cover section 71 is adhered to the inner surface of the swing arm main body 25, and the upper surface 70d and the front surface 70e of the embedded member 70.

The embedded member 70 is sandwiched between the cover section 71 and the swing arm main body 25, and is not exposed to the outside of the swing arm main body 25. In other words, the embedded member 70 is embedded in the inside of the fiber reinforced resin constituting the swing arm main body 25 and the cover section 71.

The cover upper surface section 71a includes ribs 71c extending upward from both side edges in the transverse direction of the vehicle.

The lower side walls 63b and 64b of the lower-side support section 66 include the ribs 71c, and those parts of the fiber reinforced resin constituting the swing arm main body 25 which are connected to side surfaces of the ribs 71c. Note that the lower side walls 63b and 64b may be formed from only the fiber reinforced resin constituting the swing arm main body 25, without providing the ribs 71c.

The embedded member 70 and the cover upper surface section 71a covering the upper surface 70d of the embedded member 70 constitute a lower-side guide section (guide section) that receives the lower surface 51 of the end piece 28L. The lower-side guide section 72 receives a force acting on the end piece 28L from the rear wheel 3 side.

In addition, the lower engagement section 57 of the end piece 28L is sandwiched between the left and right ribs 71c, thereby being restricted in position in the transverse direction of the vehicle.

A spacer 73 that increases the plate thickness of the rear end portion 60a of the upper wall section 60 is provided on an inner surface of the upper-side support section 65. The spacer 73 is formed from the same fiber reinforced resin as the material of the swing arm main body 25. The spacer 73 is adhered to an inner surface of the rear end portion 60a. Note that the part of the spacer 73 may be configured by the resin foam and the fiber reinforced resin-made cover section covering the resin foam, like the embedded member 70 and the cover section 71.

The spacer 73 constitutes an upper-side guide section 74 that receives the upper surface 50 of the end piece 28L.

In addition, the upper engagement section 56 of the end piece 28L is sandwiched between the left and right upper side walls 63a and 64a, thereby being restricted in position in the transverse direction of the vehicle.

A lower surface of the upper-side guide section 74 and an upper surface of the lower-side guide section 72 are provided substantially in parallel to each other, and extend substantially horizontally in the longitudinal vehicle direction.

The swing arm main body 25 is formed in a product shape by a process in which a fiber reinforced resin as a material is set in a mold, and a balloon-like tube disposed in a hollow portion of the swing arm main body 25 is inflated by air pressure or the like, whereby the fiber reinforced resin is pressed against the inner surface of the mold by the tube.

The embedded member 70 is hermetically sealed between the swing arm main body 25 and the cover section 71 simultaneously with the molding of the swing arm main body 25 by the mold. This ensures that as depicted in FIG. 8, the part ranging from a front end of the cover section 71 connected to the swing arm main body 25 to a rear end of the cover section 71 connected to the swing arm main body 25 can be formed from the fiber reinforced resin in which the fibers are continuous in the longitudinal vehicle direction, and a high rigidity can be obtained.

Note that the embedded member 70 may be hermetically sealed between the swing arm main body 25 and the cover section 71 after the molding of the swing arm main body 25. However, embedding the embedded body 70 simultaneously with the molding of the swing arm main body 25 is preferred, since it ensures that the fibers of the fiber reinforced resin constituting the cover section 71 can easily be provided to be continuous over a longer range.

In addition, the spacer 73 is adhered to the swing arm main body 25 having been molded.

The end piece 28L is inserted between the upper-side support section 65 and the lower-side support section 66 through the rear end opening 34, and is adhered to an inner surface of the swing arm main body 25. With the stopper sections 58 and 59 put in contact with a rear end surface of the swing arm main body 25, the end piece 28L is restricted in position in the longitudinal vehicle direction.

More specifically, the upper engagement section 56 of the end piece 28L is adhered to a lower surface of the upper-side guide section 74 and inner surfaces of the upper side walls 63a and 64a.

The lower engagement section 57 of the end piece 28L is adhered to an upper surface of the lower-side guide section 72 and inner surfaces of the lower side walls 63b and 64b.

In addition, front portions of the outside surface 52 and the inside surface 53 of the end piece 28L are adhered to inner surfaces of those parts of the side wall sections 63 and 64 of the swing arm main body 25 which are on the front side of the side opening 62.

The end piece 28L is sandwiched between the lower-side guide section 72 and the upper-side guide section 74, and is guided in position in the vertical direction. Since the lower-side guide section 72 and the upper-side guide section 74 are substantially parallel to each other, the end piece 28L can be mounted in position easily and with high accuracy. In addition, the end piece 28L can be formed in a simple shape, with the upper surface 50 and the lower surface 51 substantially parallel to each other.

In the present embodiment, the hollow portion 25a of the lower-side support section 66 is filled with the embedded member 70 lower in specific gravity than the fiber reinforced resin constituting the swing arm main body 25, whereby the hollow portion 25a is made to be a solid portion. This makes it possible to increase the rigidity of the lower-side support section 66 by the embedded member 70, and to restrain an increase in weight. According to the present embodiment, the solid portion can be formed more easily and with a lighter-weight configuration, as compared to a configuration in which, for example, a plurality of fiber reinforced resin layers are laminated to fill up the hollow portion 25a.

Besides, since the fiber reinforced resin-made cover section 71 covers the embedded member 70, the fiber reinforced rein-made embedded member 70 can be protected from the metallic end piece 28L.

As has been described above, according to the embodiment of the present invention, the swing arm 12 of the motorcycle 1 supports the rear wheel 3 in a swingable manner, and includes the swing arm main body 25 made of the fiber reinforced resin, the swing arm main body 25 is formed to be hollow, and the embedded member 70 of a material different from the fiber reinforced resin is embedded in such a manner as to make solid at least part of the hollow portion 25a of the swing arm main body 25.

This configuration ensures that the hollow portion 25a of the swing arm main body 25 can be easily made to be solid by the embedded member 70 of a material different from the fiber reinforced resin, and that the rigidity of the swing arm main body 25 can be enhanced.

In addition, the embedded member 70 is formed in a shape along the inner surfaces of both side wall sections 63 and 64 in the transverse direction of the vehicle of the swing arm main body 25 and along the inner surface of the lower wall section 61 which is a surface in the vertical direction of the swing arm main body 25. This configuration makes it possible to effectively fill up the hollow portion 25a with the embedded member 70, and to enhance the rigidity of the swing arm main body 25.

Note that a configuration may be adopted in which the embedded member is set along an inner surface of the upper wall section 60 which is a surface in the vertical direction of the swing arm main body 25.

Besides, the embedded member 70 is a resin foam. According to this configuration, the embedded member 70 can be provided to be light in weight and easily.

Further, the wheel support section 21 to which to mount the rear wheel 3 is provided at an end portion of the swing arm main body 25, and the solid portion with the embedded member 70 embedded therein is provided in the wheel support section 21. This configuration ensures that since the embedded member 70 is embedded in the end portion of the swing arm main body 25, it can be easily embedded. Besides, the rigidity of the wheel support section 21 on which a high load is liable to be exerted can be effectively enhanced by the embedded member 70.

In addition, the wheel support section 21 includes the end pieces 28L and 28R adapted to support the rear wheel 3, and the lower-side guide section 72 adapted to position the end pieces 28L and 28R relative to the swing arm main body 25. According to this configuration, the end pieces 28L and 28R adapted to support the rear wheel 3 can be positioned relative to the swing arm main body 25 by the lower-side guide section 72, and can be easily mounted in position.

Besides, the lower-side guide section 72 includes the embedded member 70, and the fiber reinforced resin covering the upper surface 70d of the embedded member 70. This configuration ensures that the lower-side guide section 72 can be more easily set into an arbitrary shape by the embedded member 70, the size of the lower-side guide section 72 can be more easily enlarged, and a lower-side guide section 72 higher in rigidity can be provided, as compared to a structure in which the lower-side guide section 72 is formed from the fiber reinforced resin alone.

Note that the above-described embodiment merely depicts one mode of application of the present invention, and the invention is not limited to the above embodiment.

While the embedded member 70 has been described to make solid the hollow portion 25a of the swing arm main body 25 in the above embodiment, the embedded member 70 need only have at least part thereof provided in such a manner as to connect the side wall sections 63 of the swing arm main body 25; for example, a void may be provided in part of the embedded member 70.

In addition, while the embedded member 70 has been described to be provided at a rear end portion of the swing arm main body 25 in the above embodiment, this is not restrictive of the present invention. For example, in the swing arm main body 25, the embedded member may be embedded in the hollow portion of a thin wall portion of the part partitioning the vertical communication hole 41 in FIG. 2, to form a solid portion. According to this configuration, thinning can be performed while partly enhancing rigidity with a simple configuration, and, therefore, the swing arm main body 25 can be provided in a compact form even when the vertical communication hole 41 is enlarged. Besides, the vertical communication hole 41 can be enlarged while securing the rigidity of the part portioning the vertical communication hole 41, and the degree of freedom in layout of the rear cushion unit 9 can be increased.

In addition, while the upper surface 50 and the lower surface 51 of the end piece 28L have been described to be substantially parallel in the above embodiment, this is not limitative of the present invention. The upper surface 50 and the lower surface 51 need only be so shaped as to lie along the lower surface of the upper-side guide section 74 and the upper surface of the lower-side guide section 72 of the swing arm main body 25. For example, the upper surface 50 and the lower surface 51 may be formed in a wedge shape whose vertical size increases in going rearward, according to the shapes of the upper-side guide section 74 and the lower-side guide section 72.

While the motorcycle 1 has been taken as an example of the saddle riding vehicle in describing the above embodiment, this is not restrictive of the present invention. The swing arm 12 of the present invention is applicable to saddle riding vehicles such as three-wheeled saddle riding vehicles having two front wheels or two rear wheels, and saddle riding vehicles having four or more wheels.

Modification

Figure 10:
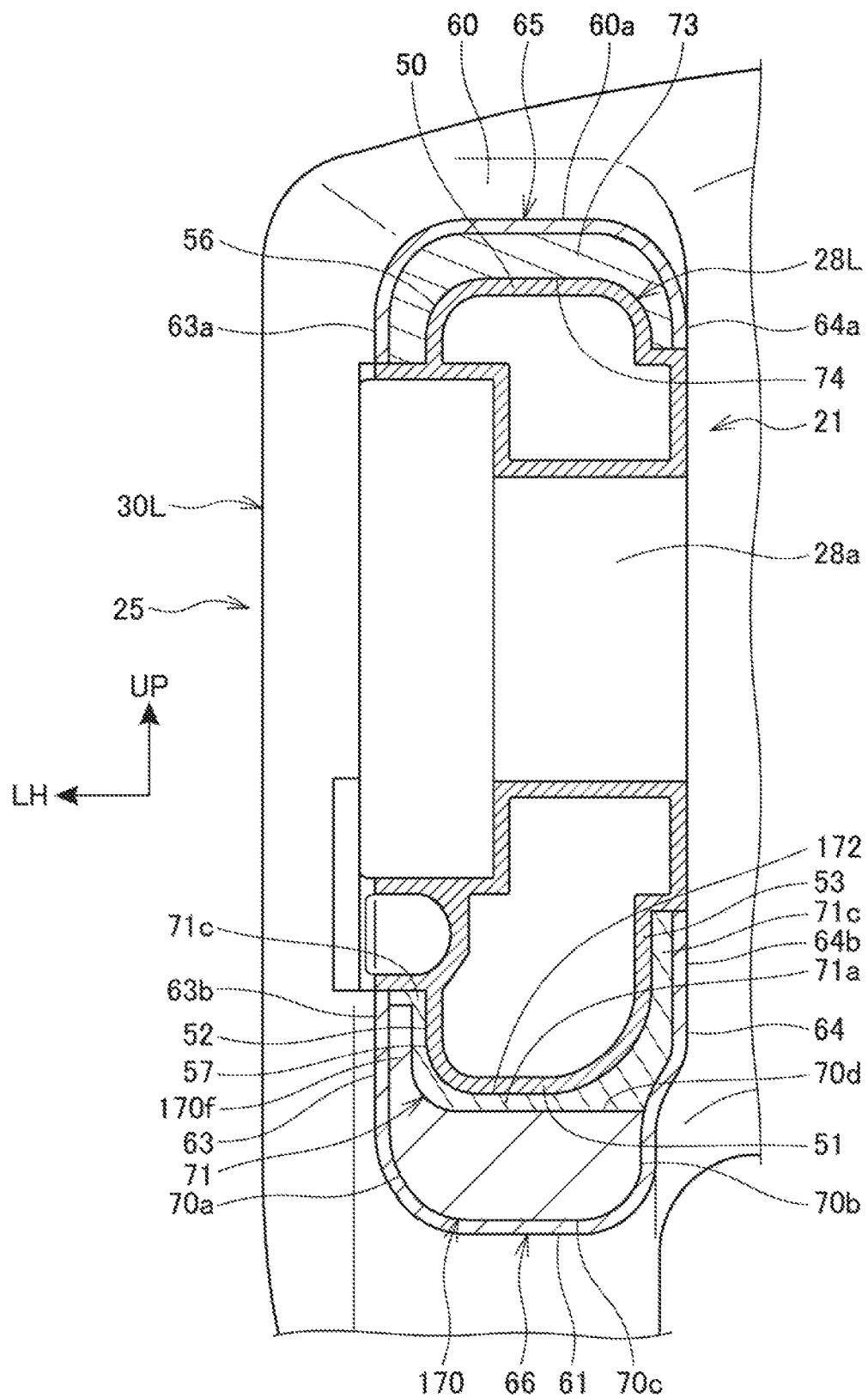
FIG. 10 is a sectional view depicting a modification of a lower-side guide section in the embodiment.

FIG. 10 is a sectional view depicting a modification of the lower-side guide section of the above described embodiment. In the modification, the parts which have the same or similar configurations to those in the above embodiment are denoted by the same reference symbols as used above, and descriptions of them will be omitted.

An embedded member 170 includes a projecting section 170f extending inside a rib 71c of a cover upper surface section 71. The embedded member 170 is covered with a cover section 71.

A lower-side guide section 172 (guide section) composed of the embedded member 170 and the cover upper surface section 71a receives the lower surface 51 of the end piece 28L by its upper surface, and guides the lower engagement section 57 of the end piece 28L in the transverse direction of the vehicle by the projecting section 170f and the fiber reinforced resin-made rib 71c covering the projecting section 170f.

DESCRIPTION OF REFERENCE SYMBOLS

1 Motorcycle (Saddle Riding Vehicle)
3 Rear wheel (Wheel)
12 Swing arm
21 Axle support section
25 Swing arm main body
25a Hollow portion
28L, 28R End piece
61 Lower wall section (Surface in vertical direction)
63 Side wall section (Side surface in transverse direction of vehicle)
64 Side wall section (Side surface in transverse direction of vehicle)
70, 170 Embedded member
70d Upper surface (surface)
72, 172 Lower-side guide section (Guide section)

The invention claimed is:

1. A swing arm for a saddle riding vehicle that supports a wheel in a swingable manner, the swing arm comprising:
    a swing arm main body made of a fiber reinforced resin, said swing arm main body being formed into a hollow shape;
    an embedded member of a material different from the fiber reinforced resin; and,
    a wheel support section to which the wheel is mounted, said wheel support section being provided at an end portion of the swing arm main body;
    wherein the wheel support section includes an end piece adapted to support the wheel, and a guide section adapted to position the end piece relative to the swing arm main body,
    wherein an upper side and a lower side of said end piece correspond to an upper side and a lower side, respectively, of the vehicle, the guide section comprises an upper-side support section and a lower-side support section that extend in a longitudinal vehicle direction and that are provided at an upper side and a lower side of a side opening, respectively, wherein the side opening penetrates a pair of side walls of the swing arm main body and opens to a rear of the swing arm main body, the pair of side walls face each other across a hollow portion of the swing arm main body in a vehicle width direction, the upper-side support section and the lower-side support section comprise, at a rim of the side opening, a pair of rails formed by the pair of side walls, the end piece is inserted between the upper-side support section and the lower-side support section along the rails so as to fill the side opening, and is supported by the upper-side support section and the lower-side support section in a vertical direction of the vehicle, and the embedded member is embedded in a space between the pair of side walls of the lower-side support section.

2. The swing arm for the saddle riding vehicle according to claim 1, wherein the embedded member is formed in a shape along inner surfaces of both side surfaces in a transverse direction of the vehicle of the swing arm main body and along an inner surface of a surface in the vertical direction of the swing arm main body.

3. The swing arm for the saddle riding vehicle according to claim 1, wherein the embedded member is a resin foam.

4. The swing arm for the saddle riding vehicle according to claim 1, wherein the fiber reinforced resin covers a surface of the embedded member.

* * * * *